April 8, 1930.  D. P. CORCORAN  1,753,364
SIGNAL DEVICE
Filed June 25, 1929   2 Sheets-Sheet 1
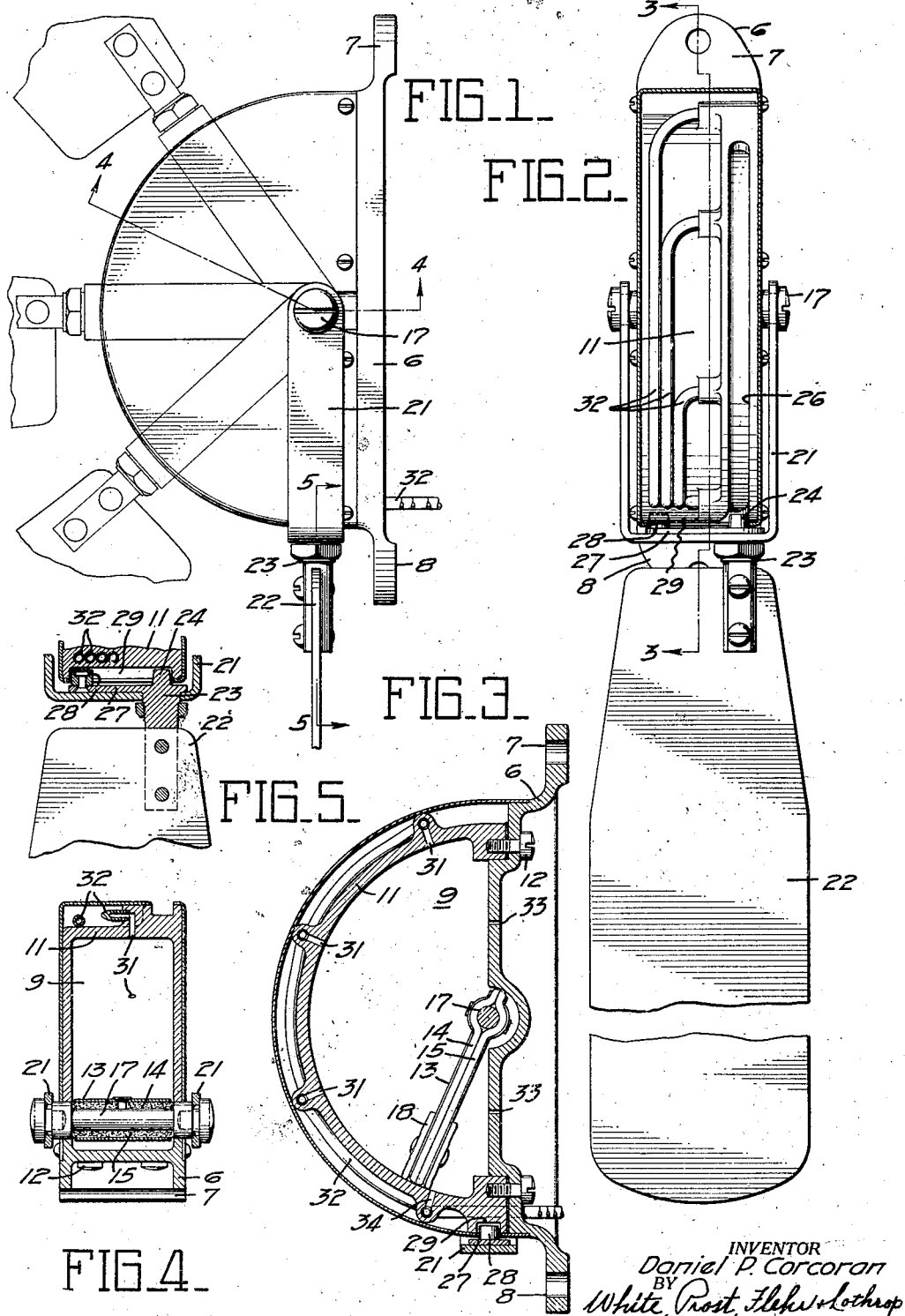

April 8, 1930. D. P. CORCORAN 1,753,364
SIGNAL DEVICE
Filed June 25, 1929 2 Sheets-Sheet 2
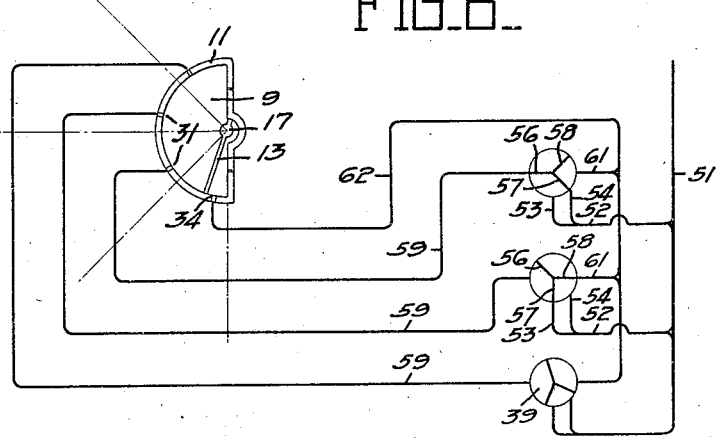
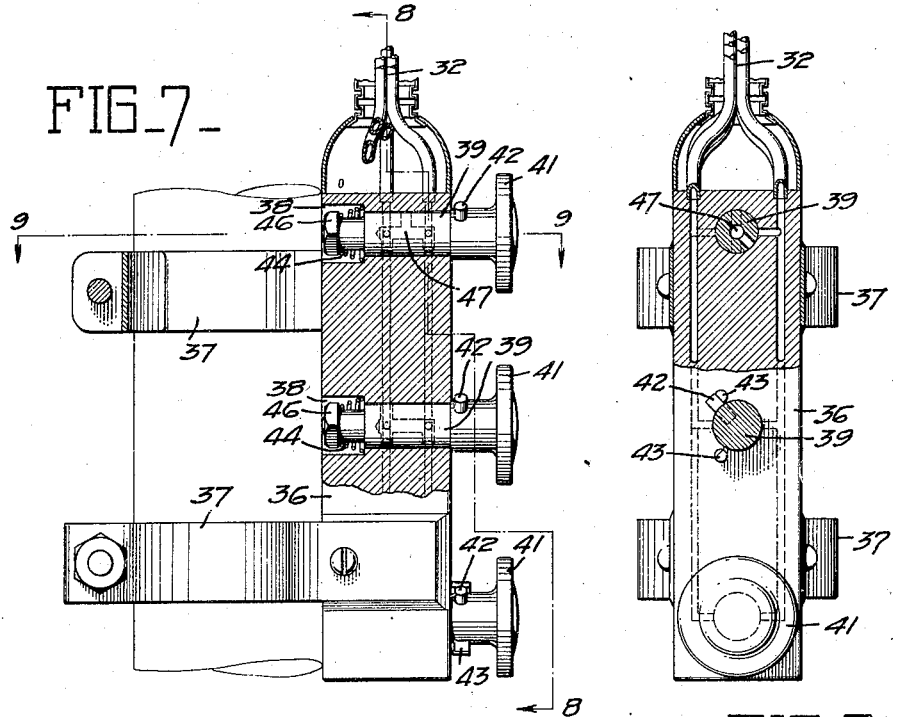
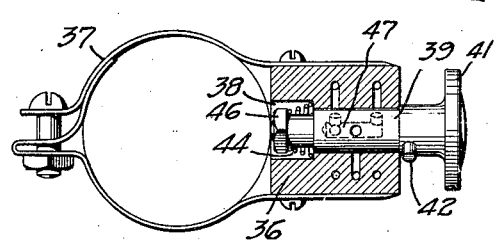
INVENTOR
Daniel P. Corcoran
BY
White, Prost, Flehr & Lothrop
ATTORNEYS Patented Apr. 8, 1930

1,753,364

UNITED STATES PATENT OFFICE

DANIEL P. CORCORAN, OF GRIDLEY, CALIFORNIA

SIGNAL DEVICE

Application filed June 25, 1929. Serial No. 373,499.

My invention relates particularly to devices adapted to be secured to vehicles for indicating to observers the contemplated course of the vehicle.

An object of my invention is to provide a device for indicating any one of several different courses of a vehicle in an easily visible manner and so as to attract attention.

Another object of my invention is to provide means for controlling a signal device from a distance.

Another object of my invention is to provide a signal device which is power operated.

The foregoing and other objects are attained in the embodiment of the invention shown in the drawings, in which Fig. 1 is a side elevation of the signal device of my invention, portions of the indicator being broken away.

Fig. 2 is an end elevation of the signal device of my invention, the casing being broken away.

Fig. 3 is a cross section on the line 3—3 of Fig. 2.

Fig. 4 is a cross section on the line 4—4 of Fig. 1.

Fig. 5 is a detail of the connection between the indicator and cylinder, portions being shown in cross section on the line 5—5 of Fig. 1.

Fig. 6 is a diagram disclosing the actuating valves and their connections.

Fig. 7 is a side elevation of the valve, portions being disclosed in cross section on a median plane.

Fig. 8 is an end elevation of the valve portions being shown in section on the line 8—8 of Fig. 7.

Fig. 9 is a cross section on the line 9—9 of Fig. 7.

In its preferred form, the signal device of my invention is used with an evacuating means and includes a cylinder having portions adapted to be selectively evacuated and a piston operable in the cylinder for moving an indicator to any one of several different indicating positions.

In the form of the invention disclosed in the drawing, I preferably provide a mounting base 6 adapted to be secured by perforated lugs 7 and 8 to any suitable support which preferably is a convenient exterior portion of an automobile or similar vehicle. Cooperating with the base 6 to provide an enclosed cylinder 9 is an arcuate cap 11 secured to the base by suitable studs 12. The enclosure 9 is substantially air tight and receives a piston 13 formed of two leaves 14 and 15 adapted to be pivotally mounted on an axle 17 journalled in opposite sides of the cap 11. The radial extremity of the piston 13 preferably is provided with packing 18 to afford a seal against communication between opposite sides of the piston.

In order to afford an indication of the selected course for the vehicle to which the device of my invention is attached, I preferably affix an indicator to move in conjunction with the piston 13. In the present instance, a yoke 21 is fastened to move with the axle 17 and extends around the cap 11. Rotatably mounted on the yoke is an indicium 22 preferably in the form of a blade having a spindle 23 journalled in the yoke. The spindle suitably projects to form a pin 24 received in a cam track or slot 26 afforded in the periphery of the cap 11. The pin 24 thus acts as a reinforcement and as an additional support for the indicium 22. The pin is also preferably connected by an extension 27, as shown in Figs. 2 and 5, to a cam roller 28 which is adapted to move in the groove 26. In one position of the indicium 22, the cam roller 28 and the pin 24 are disposed in a transverse extension 29 of the groove 26 so that the plane of the indicium 22 also contains the axis of the axle 17. The described arrangement is such that when the indicium is in the position shown in Figs. 1 and 2, its edge is all that is visible to an observer. However, when the piston 13 is rotated with its axle 17, and the indicium is raised to the light line positions as shown in Fig. 1, the roller 28 follows in the cam groove and the plane of the indicium becomes perpendicular to the axis of the axle 17 so that the entire face of the indicium is visible to an observer.

For variably positioning the piston 13 and, in consonance therewith, the indicium 22 in any one of several positions to indicate the subsequent course of the vehicle to which the device is attached, I preferably provide means for evacuating selectively various restricted portions of the cylinder 9. At various spaced points about the periphery of the cap 11 at which I desire the piston 13 to be retained, I preferably provide apertures 31 which are connected by individual conduits 32 with a means for evacuating the cylinder 9. In addition, I preferably perforate the base 6 by by bleed holes 33 on opposite sides of the piston 13 to afford restricted communication between the interior of the cylinder 9 and the atmosphere.

When one of the conduits 32 is connected to the means for evacuation, the interior of the cylinder 9 is evacuated. This occurs because the capacity of the evacuating means and its connection is sufficient to withdraw more air from the interior of the cylinder 9 than can gain access thereto through the respective bleed holes 33. Such being the case, the piston 13 is moved in the direction of the lowest pressure. This movement is facilitated by the ingress of air on the other side of the piston through the associated bleed hole 33.

The piston revolves about its axis 17 until it overlies the aperture 31 through which the egress of air is taking place. The positioning of the piston over the aperture prevents further evacuation of the selected region of the cylinder, and, furthermore, the action of the evacuating means tends to hold the piston exactly over the connected aperture. In this fashion the piston may be moved to overlie any selected one of the apertures 31 and will remain in such position during the connection of the selected aperture with the means for evacuation.

Since the normal position of the piston 13 is as shown in Fig. 3 I preferably afford an aperture 34 likewise connectible to the means for evacuation for returning the piston to its normal position. This return movement is accomplished by disconnecting the particular one of the apertures 31 which is operating and connecting the interior of the cylinder 9 through aperture 34 with the evacuation means.

As a means for selecting the desired one of the apertures 31 or 34 for evacuating the selected portion of the interior of the cylinder 9 I preferably provide the valve body disclosed in Figs. 7, 8 and 9. This valve body preferably comprises a block 36 having clamps 37 adapted to secure the block to the steering column or other suitable point of attachment of an automobile. The block carries a plurality of transverse passages 38 for the reception of valve plugs 39. Each of the plugs 39 carries a hand wheel 41 for convenient manual operation. The plugs can also be provided with projections 42 adapted to contact stops 43 for preventing undue movement of the valve bodies. The valve bodies 39 are preferably yieldingly held in position by springs 44 surrounding their stems and retained by nuts 46. The valve plugs are provided with a plurality of passages generally designated as 47 which afford various intercommunications between the means for evacuating which normally is the intake manifold of an internal combustion engine, and the cylinder.

As particularly shown in Fig. 6, the conduit 51 leads from the means for providing evacuation through channels 52 to branch conduits 53 and 54 in each of the valves. The valve plugs themselves are provided with intercommunicating passages 56, 57 and 58 arranged preferably as shown in Fig. 6. The passages 56 are adapted to be continued by conduits 59 from each of the valve plugs leading to the selected one of the apertures 31. The passages 58 are likewise adapted to communicate with conduits 61 leading to a common duct 62 communicating through aperture 34 with the interior of the cylinder 9.

The three valves, as indicated in Fig. 6, can assume the three positions shown. The uppermost valve in the figure shows communication between the source of evacuation through the conduits 51 and 52 and the branch 54 with the passages 57 and 56 leading to a conduit 59 and the lowermost aperture 31. The passage 58 in this valve position is out of communication with the passages 53 and 61 and the flow through the valve plug is to evacuate the portion of the cylinder 9 represented by the lower aperture 31. The middle valve plug in Fig. 6 is shown as positioned with the conduit 52 connecting through branch 53, and passages 57 and 58 with the exhaust line 61 which leads through conduit 62 to the aperture 34. In this position of the valves the piston 13 is returned to its lowermost or normal position. The lower plug in Fig. 6 is arranged with none of its passages in communication with either the exhaust or evacuating ducts so that there is no communication whatsoever through this valve plug and with this position of the valve, all of the passageways controlled thereby are out of operation. It is to be understood that normally at least two of the valve plugs are in the position disclosed in the lower part of Fig. 6 while one of the other valve plugs is operated either to the position shown in the upper portion of Fig. 6 or to the position shown in the middle part of Fig. 6.

When the signal device of my invention is installed on an automobile, for instance, the vehicle operator can variously position the indicium 22 for indicating the projected course of the vehicle, by the proper manipulation of the hand wheels 41. After completing the particular maneuver indicated, he can, by suitable manipulation of the hand wheel 41, restore the signal to its normal, depending position pending further use. The rotation or revolution of the indicium about its own axis when moving from normal position to a signalling position enhances the indicating value of the signal inasmuch as it attracts attention. The entire device is inconspicuous when not in use but is effective to provide a distinctive and attention arresting signal. Since the controlling device and the signal itself are separate they can be placed remote from each other for the greatest convenience in installation and for the greatest visibility.

It is to be understood that I do not limit myself to the form of the signal device shown and described herein, as the invention, as set forth in the following claims may be embodied in a plurality of forms.

I claim:

1. A signal device comprising a base, an indicator adapted to move pivotally on said base to any one of a plurality of selected positions, and means for revolving said indicator on its own axis during said pivotal movement.

2. A signal device comprising a base, an arm pivoted on said base and adapted to rotate about said pivot to any one of a plurality of selected positions, an indicium rotatably mounted on said arm, and means for rotating said indicium on said arm during the rotation of said arm about said pivot.

3. A signal device comprising a base including a cylinder, a piston pivoted on said base and adapted to move in said cylinder, a plurality of ducts communicating with said cylinder, means for selectively connecting said ducts to evacuate selected regions of said cylinder whereby said piston is selectively positioned, an arm mounted to pivot with said piston, an indicium rotatably mounted on said arm, and means for rotating said indicium during the pivotal movement of said arm.

4. A signal device comprising a cylinder, a piston movable to selected positions in said cylinder, an arm adapted to move with said piston, an indicium rotatable on said arm, a follower on said indicium, and a cam on said cylinder engaged by said follower for rotating said indicium during movement of said arm.

5. A signal device comprising a cylinder, a piston pivotally mounted in said cylinder, an indicator adapted to pivot with said piston, means for evacuating said cylinder for selectively positioning said piston, and means for revolving said indicator on its own axis during a pivotal movement of said indicator.

6. A signal device comprising a cylinder, a piston pivotally mounted in said cylinder, an indicator affixed to said piston, a plurality of ducts communicating with said cylinder, means for selectively connecting said ducts to evacuate selected portions of said cylinder whereby said piston and said indicator are selectively positioned, and means for revolving said indicator about its own axis during the positioning of said indicator.

In testimony whereof, I have hereunto set my hand.

DANIEL P. CORCORAN.